(12) United States Patent
Hammons et al.

(10) Patent No.: US 10,146,628 B2
(45) Date of Patent: Dec. 4, 2018

(54) SOFTWARE BACKUP AND RESTORATION PROCEDURES USING APPLICATION AND FILE MONITORING

(71) Applicant: Dell Products, L.P., Round Rock, TX (US)

(72) Inventors: Marc Hammons, Round Rock, TX (US); Yuan-Chang Lo, Austin, TX (US); Michael Gatson, Austin, TX (US); Philip Seibert, Austin, TX (US); Todd Swierk, Austin, TX (US); Nikhil Vichare, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 162 days.

(21) Appl. No.: 15/185,832

(22) Filed: Jun. 17, 2016

(65) Prior Publication Data
US 2017/0364274 A1 Dec. 21, 2017

(51) Int. Cl.
*G06F 11/14* (2006.01)

(52) U.S. Cl.
CPC ................... *G06F 11/1446* (2013.01)

(58) Field of Classification Search
CPC ................... G06F 11/1451; G06F 17/30144
See application file for complete search history.

(56) References Cited

U.S. PATENT DOCUMENTS

2008/0250083 A1* 10/2008 Kovacs ............... G06F 9/44505

* cited by examiner

*Primary Examiner* — Gary W. Cygiel
(74) *Attorney, Agent, or Firm* — Fogarty LLP

(57) ABSTRACT

Embodiments provide the ability to configure software backup and restoration procedures on an IHS (Information Handling System) with minimal or no input from a user. Embodiments utilize local monitors on an IHS in order to generate metadata describing the use of software applications installed on the IHS. A remote analytics engine process the metadata received from multiple participating IHSs to generate inputs used by the restoration and backup procedures implemented by the IHS. The metadata generated by an IHS is used to determine valuations for the applications and files installed on the IHS. These valuations may then be utilized to identify files of significant value to the user, which may then be designated for backup by the backup procedures implemented by the IHS. The generated valuations may also be used to select the applications that should be reinstalled in order to restore the IHS to an approximated prior operating state.

17 Claims, 6 Drawing Sheets

| 710 YOUR APPLICATIONS | 725 LAST USED | ACTION 730 |
|---|---|---|
| CHROME | 2 DAYS AGO | DOWNLOAD AND INSTALL ▽ |
| SPOTIFY | YESTERDAY | DOWNLOAD AND INSTALL ▽ |
| ADOBE READER | 1 WEEK AGO | DOWNLOAD AND INSTALL ▽ |
| GIMP | 12 MONTHS AGO | DO NOT INSTALL ▽ |
| ... | | |
| 715 YOUR DATA | | |
| CARBONITE | YESTERDAY | INSTALL AND RECOVER DATA ▽ |
| DROPBOX | 1 WEEK AGO | INSTALL AND SYNC ▽ |
| ... | | |
| 720 SOFTWARE FOR YOUR DEVICES | | |
| LEXMARK PRINTER | 4 DAYS AGO | DOWNLOAD AND INSTALL ▽ |
| DELL AXIM | 12 YEARS AGO | DO NOT INSTALL ▽ |
| CANON SCANNER | 3 WEEKS AGO | DOWNLOAD AND INSTALL ▽ |
| ... | | |
| | | REBUILD |

FIG. 7

| MAP ID | APPLICATIONS | DIRECTORIES | FILE TYPES | FILES | GEO LOCATION | STORAGE LOCATION |
|---|---|---|---|---|---|---|
| M1 | A1 | D1 | FT1 | F1 | GL1 | SL1 |
| | A1 | D2 | FT2 | F2 | GL1 | |
| | A2 | D1 | FT1 | F3 | GL2 | SL1 |
| | A2 | D3 | FT6 | F4 | GL2 | |
| | A2 | D3 | FT7 | F5 | GL2 | |
| | A3 | D2 | FT2 | F2 | GL1 | SL2 |
| | A3 | D4 | FT6 | F6 | GL1 | |
| M2 | A1 | | | | | |
| | A1 | | | | | |
| | A59 | | | | | |
| ∘∘∘ | ∘∘∘ | ∘∘∘ | ∘∘∘ | ∘∘∘ | ∘∘∘ | ∘∘∘ |

FIG. 8

SOFTWARE BACKUP AND RESTORATION PROCEDURES USING APPLICATION AND FILE MONITORING

FIELD

This disclosure relates generally to software backup and restoration procedures for Information Handling Systems (IHSs), and more specifically, to identification of software resources to be included in a backup and restoration procedures.

BACKGROUND

As the value and use of information continues to increase, individuals and businesses seek additional ways to process and store information. An option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

A wide variety of software applications may be installed on an IHS, such as a personal computer. These software applications include both user-level software applications and lower-level software applications that are responsible for various aspects of the IHS's capabilities. These software applications may be regarded as collections of files of various types. For instance, a software application may consists of program code files that are used to implement the functionality of the software application. In addition, each software application may utilize a variety of resource files that are used to store information such as settings that are used by the application. Various output files may be generated as a result of the user's operation of the software application. Certain applications may require the use of files such as drivers used for interfacing with the hardware of the IHS. In addition to files that are associated with individual software applications, an IHS may utilize various types of general resource files, such as registry settings, encryption keys and security certificates.

This wide assortment of files that may be used by an IHS significantly complicates the ability for a user to implement software backup procedures that efficiently preserve the files of most importance to the user. Software backup procedures that create a backup copy of every file on a computer require large amounts of storage space and may result in many files being needlessly backed up. More selective back up procedures require the identification of the specific files, file extensions and/or directories to be backed up. For instance, the configuration of a backup procedure may require a user to identify all directories on an IHS that are to be backed up to a remote location. This can result in a complex and error-prone task that requires a user to understand the directories and files used by each software application. This task can be further complicated by the use of non-standard installation settings, the use of uncommon file extensions and the use of non-standard hardware, such as an additional storage drive, used by an IHS. This backup configuration task may complicated even further for low-level software applications that operate without the user's knowledge. The dependence on a user's ability to configure backup procedures in such complex environments results in ineffective backup procedures that fail to backup critical files, and in many cases, also waste storage resources by backing up unnecessary files.

If files have been stored to a backup repository, the backed up files may be retrieved and used to restore an IHS to a prior operating state. In certain scenarios, an IHS must be rebuilt, such as due to drive failures or migration to new hardware. In such scenarios, rebuilding an IHS may require re-installing the operating system of the IHS and thus may also require re-stalling all software applications on the IHS. Backups may be used to restore a prior operating state for some of the re-installed software applications. For instance, upon re-installing a word processing program, backups may be used to restore the user-created files, settings and customizations in use prior to the restoration of the IHS.

Using backups to restore a prior state of a software application may be a complex administrative procedure. A user must be able to identify the files necessary to restore an application to a specific prior operating state. This may require a user to correctly identify all files containing information describing the specific operating state that is to be restored, including both user-level files and lower-level files such as license keys, drivers and customizations. Restoring a prior operating state of a software application may be further complicated by the use of remote resources by the application. As described, this task is complicated further by the fact that an IHS may utilize a wide variety of software applications, each utilizing different combinations of files are necessary for restoring a prior operating state.

SUMMARY

Embodiments described herein provide methods, systems and devices for providing users with the ability to configure software backup and restoration procedures on an IHS with minimal or no input from a user. Embodiments utilize local monitors on an IHS in order to generate metadata describing the use of software applications installed on the IHS. A remote analytics engine may be used to process the metadata received from multiple participating IHSs in order to generate inputs used by the restoration and backup procedures implemented by the IHS. The metadata generated by an IHS may be used according to various embodiments to determine valuations for the applications and files installed on the IHS. These valuations may then be utilized to identify files of significant value to the user, which may then be designated for backup by the backup procedures implemented by the IHS. The generated valuations may also be used to select the applications that should be reinstalled in order to restore the IHS to an approximated prior operating state.

According to various embodiments, a method for determining procedures for backing up software files installed on an IHS includes receiving first metadata describing file operations on a first IHS, wherein the first metadata includes information describing monitored file operations for a first software file on the first IHS; determining, based on the first metadata, a valuation for the first software file, wherein the valuation is determined based on a level of monitored file operations for the first software file; determining a decision to back up the first software file based on the determined valuation of the first software file; and transmitting the backup recommendation to the first IHS.

According to various additional embodiments, wherein the monitored file operations indicate storage of user input to the first software file. According to various additional embodiments, the method further includes receiving second metadata describing input to a user interface of a software application installed on the first IHS; and determining, based on the first metadata and the second metadata, whether the monitored file operations resulted from the input to the user interface reported in the second metadata. According to various additional embodiments, the valuation of the first software file is increased if the monitored file operations are determined to result from the input to the user interface reported in the second metadata. According to various embodiments, the method further includes receiving third metadata describing file operations on a second IHS, wherein the third metadata includes information describing monitored file operations for a second software file on the second IHS; determining, based on the received third metadata, a valuation for the second software file, wherein the valuation is determined based on a level of file operations for the second software file; determining, based on the first metadata and the third metadata, whether the first software file and the second software file are of a same type and each have a valuation above specified threshold; and increasing the valuation of the first software file and the second software file, if the first software file and the second software file are determined to be of the same type and determined to have a valuation above the specified threshold. According to various additional embodiments, the type of the files is determined based on the extensions of the files. According to various additional embodiments, the method further includes determining, based on the first metadata, a directory on the IHS in which the first software file is located; adjusting a valuation for the directory based on the valuation of the first software file; and determining a decision to back up the directory based on the determined valuation of the directory.

According to various embodiments, a method for determining software restoration procedures for use by an IHS includes receiving first metadata describing file operations on a first IHS, wherein the first metadata includes information describing monitored file operations for a first software file on the first IHS; determining, based on the first metadata, a valuation for the first software file, wherein the valuation is determined based on a level of monitored file operations for the first software file; identifying a first software application installed on the first IHS, wherein first software application is associated with the first software file; updating a valuation for the first software application based on the valuation of the first software file; determining a recommendation to reinstall the first software application on the first IHS based on the updated valuation of the first software application; and transmitting the reinstallation recommendation to the first IHS.

According to various additional embodiments, the first software application may be used to modify the first software file. According to various additional embodiments, the first software file is used to configure the first software application. According to various additional embodiments, the monitored file operations for the first software file indicates storage of user input to the first software file. According to various additional embodiments, the method further includes receiving second metadata describing input by a user to a user interface of the first software application; and identifying, based on the first metadata and the second metadata, whether the file operations resulted from user input to the user interface reported in the second metadata. According to various additional embodiments, the valuation of the first software file is increased if the file operations are identified as resulting from user input to the user interface reported in the second metadata. According to various additional embodiments, the method further includes receiving third metadata describing file operations on a second IHS, wherein the third metadata includes information describing monitored file operations for a second software file on the second IHS; and determining, based on the first metadata and the third metadata, whether the first software application is installed on the second IHS.

According to various embodiments, a method for implementing software preservation procedures on an IHS includes monitoring file operations for a first software file on the IHS; generating first metadata describing the monitored file operations; transmitting the first metadata to a remote analytics engine; receiving, from the remote analytics engine, a valuation for the first software file, wherein the valuation is determined based on a level of monitored file operations for the first software file; and selecting a software preservation procedure for the first software file based on the received valuation.

According to various additional embodiments, the software preservation procedure is a procedure for backing up the first software file to a remote location. According to various additional embodiments, the software preservation procedure is a procedure for reinstalling the first software file on the IHS. According to various additional embodiments, the method further includes receiving, from the remote analytics engine, a valuation for a first software application installed on the IHS, wherein the valuation is determined based on a level of monitored file operations for the first software file; and selecting a recommended software preservation procedure for the first software application based on the received valuation for the first software application, wherein the software preservation procedure is a procedure for reinstalling the first software application on the IHS. According to various additional embodiments, the method further includes receiving, from the remote analytics engine, a valuation for a first directory on the file system of the IHS, wherein the valuation is determined based on a level of monitored file operations for the first software file, and wherein the first software file is located in the first directory; and selecting a recommended preservation procedure for the first directory based on the received valuation for the first directory. According to various additional embodiments, the software preservation procedure is a procedure for backing up all of the software files located in the first directory.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 7 is a diagram illustrating a user interface, according to certain embodiments, for providing restoration determinations to a user for approval.

FIG. 8 is a diagram illustrating a table that may be used in certain embodiments to store application fingerprint information.

DETAILED DESCRIPTION

For purposes of this disclosure, an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal desktop or laptop computer, a mobile phone, a tablet, a 2-in1 laptop/tablet, a server computer, a consumer electronic device, a gaming console, a printer, an automobile information system, a network storage device, a network router, a network video camera, or any other suitable device and may vary in size, shape, performance, functionality, and price. The IHS may include memory, one or more processing resources, e.g., a central processing unit (CPU) or hardware or software control logic. Additional components or the IHS may include one or more storage devices, one or more communications ports for communicating with external devices as well as various input and output (I/O) devices, e.g., a keyboard, a mouse, and a video display. The IHS may also include one or more buses operable to transmit communication between the various hardware components.

Also for purposes of this disclosure, computer-readable media may include any instrumentality or aggregation of instrumentalities that may retain data and/or instructions for a period of time. Computer-readable media may include, without limitation, storage media, e.g., a direct access storage device (e.g., a magnetic hard drive, an optical drive, a solid-state drive), a sequential access storage device (e.g., a tape drive), compact disk, CD-ROM, DVD, random access memory (RAM), read-only memory (ROM), electrically erasable programmable read-only memory (EEPROM), and/or flash memory. Computer-readable media may also include optically readable barcodes (one or two-dimensional), plastic cards with embedded magnetic strips, mechanically or optically read punched cards, or radio frequency identification tags.

Figure 1:
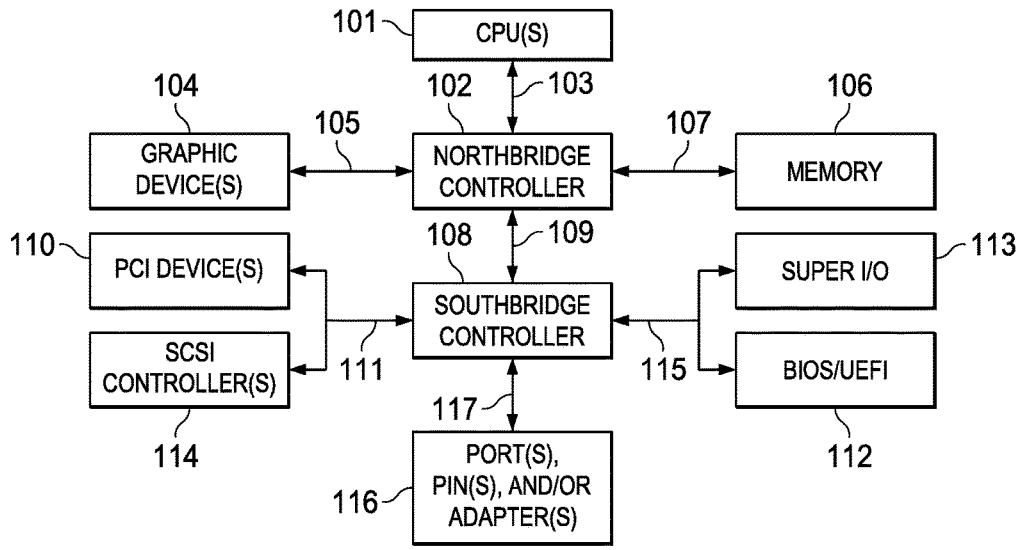
FIG. 1 is a block diagram illustrating certain components of an IHS.

FIG. 1 is a block diagram of certain components of an IHS, as described with respect to an IHS configured according to various embodiments for generating and/or utilizing software backup and restoration procedures that utilize software application monitoring. As illustrated, an IHS may include one or more CPUs 101. In various embodiments, an IHS may be a single-processor system including one CPU 101, or a multi-processor system including two or more CPUs 101 (e.g., two, four, eight, or any other suitable number). CPU(s) 101 may include any processor capable of executing program instructions. For example, in various embodiments, CPU(s) 101 may be general-purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 101 may commonly, but not necessarily, implement the same ISA.

In certain embodiments, CPU(s) 101 are coupled to northbridge controller or chipset 101 via front-side bus 103. Northbridge controller 102 may be configured to coordinate I/O traffic between CPU(s) 101 and other components. For example, in the illustrated embodiment, northbridge controller 102 is coupled to graphics device(s) 104 (e.g., one or more video cards or adaptors) via graphics bus 105 (e.g., an Accelerated Graphics Port or AGP bus, a Peripheral Component Interconnect or PCI bus, or the like). Northbridge controller 102 may also be coupled to system memory 106 via memory bus 107. According to various embodiments, memory 106 may be configured to store program instructions, and/or data accessible by CPU(s) 101. In various embodiments, memory 106 may be implemented using any suitable memory technology, such as static RAM (SRAM), synchronous dynamic RAM (SDRAM), nonvolatile/Flash-type memory, or any other type of memory.

Northbridge controller 102 may be coupled to southbridge controller or chipset 108 via internal bus 109. Southbridge controller 108 may be configured to handle various I/O capabilities supported by an IHS, and it may provide interfaces such as, for instance, Universal Serial Bus (USB), audio, serial, parallel, Ethernet, or the like via port(s), pin(s), and/or adapter(s) 116 over bus 117. For example, southbridge controller 108 may be configured to provide trusted communications between an IHS and remote analytics service. In various embodiments, southbridge controller 108 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol. As described, the I/O capabilities of an IHS may be utilized to interface via a networking protocol with a remote analytics service.

Southbridge controller 108 may also enable connection to one or more keyboards, keypads, touch screens, scanning devices, voice or optical recognition devices, or any other devices suitable for entering or retrieving data. Multiple I/O devices may be present in an IHS. In some embodiments, I/O devices may be separate from an IHS and may interact with an IHS through a wired or wireless connection. As shown, southbridge controller 108, may be further coupled to one or more PCI devices 110 (e.g., modems, network cards, sound cards, or video cards) and to one or more SCSI controllers 114 via parallel bus 111. Southbridge controller 108 may also be coupled to Basic I/O System (BIOS)/UEFI 112 and to Super I/O Controller 113 via Low Pin Count (LPC) bus 115. Super I/O Controller 113 may combine interfaces for a variety of lower bandwidth or low data rate devices. Those devices may include, for example, floppy disks, parallel ports, keyboard and mouse, environmental sensors and fan speed monitoring/control, among others.

BIOS/UEFI 112 may include non-volatile memory having program instructions stored thereon. Those instructions may be usable CPU(s) 101 to initialize and test other hardware components and/or to load an Operating System (OS) for operation of an IHS. The BIOS/UEFI 112 initializes and tests the hardware components of an IHS, executes any pre-boot processes, such as Dell ePSA diagnostic processes in certain embodiments, and loads a boot loader or an OS from a memory device. The BIOS/UEFI 112 provides an abstraction layer for the hardware which enables software executed by the IHS to interact with certain I/O devices such as keyboards, displays, etc. Incidentally, the Unified Extensible Firmware Interface (UEFI) was designed as a successor to BIOS to address certain technical issues. As a result, modern IHSs predominantly use UEFI firmware and the term BIOS, as used herein, is intended also encompass UEFI firmware and future variations thereof.

Figure 2:
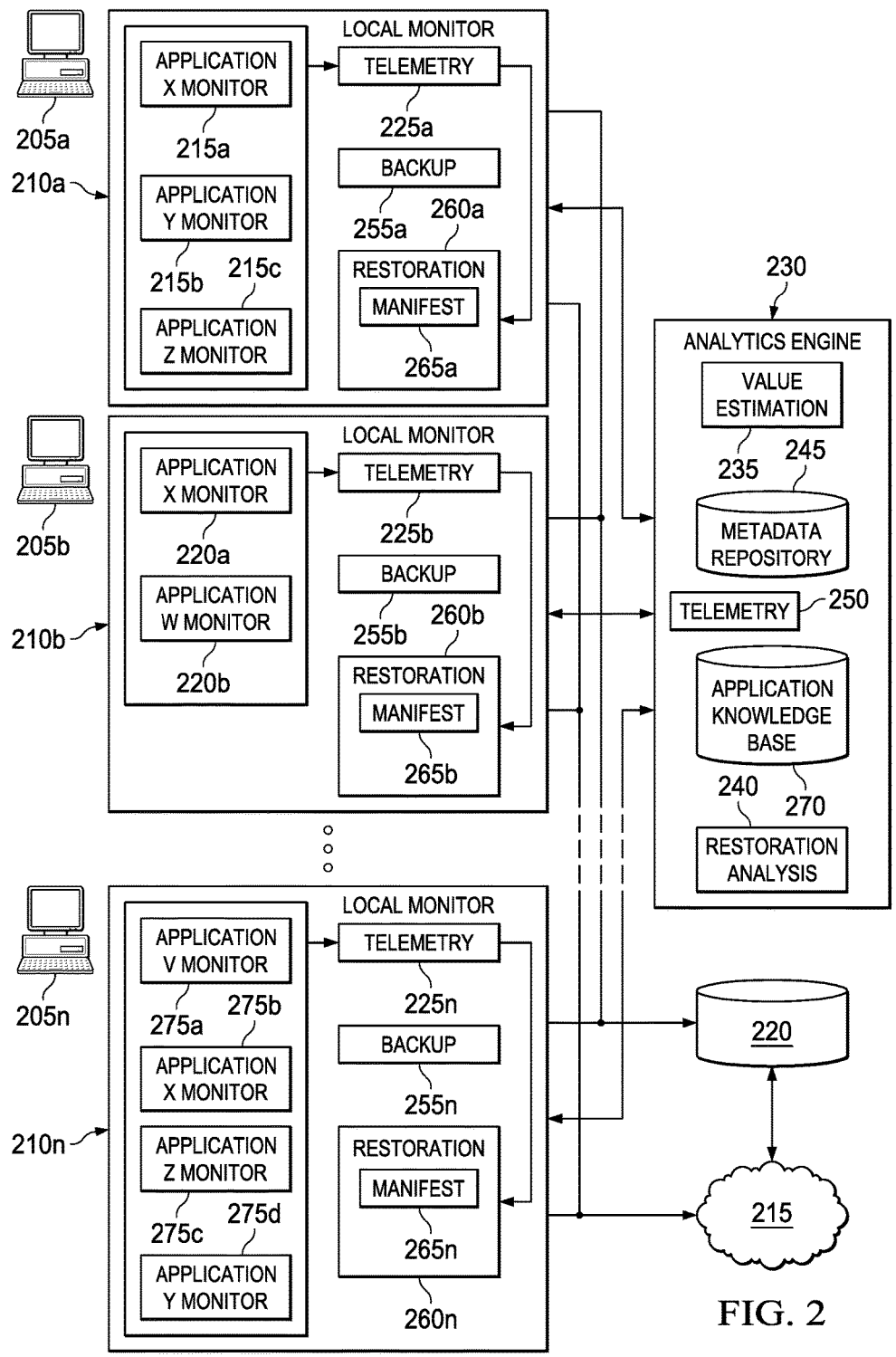
FIG. 2 is a diagram illustrating an example of an environment where systems and methods systems are configured according to various embodiments to provide software backup and restoration procedures that utilize application monitoring.

FIG. 2 illustrates a system according to various embodiments, where the system is configured to provide valuation inputs to software backup and restoration procedures, where the valuation inputs are based on metadata that is generated via application monitoring. In certain of the various embodiments, an analytics engine 230 processes the provided metadata in order to determine relative valuations for the software applications and files installed on the IHS 205a-n. In certain embodiments, these valuation determinations made by the analytics engine 230 may then be used by the IHSs 205a-n to implement software backup procedures that may be accomplished without requiring manual identification of the files, applications and/or directories to be backed up. In some scenarios, rebuilding an IHS may be necessary, in which case the rebuilding may require reinstallation of all software on the IHS. In certain embodiments, the valuation determinations generated by the analytics engine 230 may be used by IHSs 205a-n to select the software applications to be re-installed upon an IHS being rebuilt. Utilizing the valuation input, applications can be selected for re-installation based on their estimated value to the user. In this manner, an IHS may be restored to an approximation of a prior operating state that omits re-installation of unused software applications.

In the illustrated embodiment of FIG. 2, each of the IHSs 205a-n are laptop computers. As described above, an IHS may be one of various different types of computing devices. Accordingly, in certain embodiments, one or more of the IHSs of FIG. 2 may instead be IHSs other than laptop computers that utilize software backup procedures and/or software restoration procedures. In the illustrated embodiment, the analytics engine 230 is depicted as a single component. In other embodiments, the analytics engine may be implemented as a cloud service or other service that is implemented using one or more servers.

Each of the IHSs 205a-n participating in the software backup and restoration procedures may include a local monitor 210a-n. Each of the local monitors 210a-n may be configured to track various aspects of the use of the software applications installed on a participating IHS 205a-n. For instance, local monitor 210a tracks certain of the software operations of IHS 205a. The local monitor 210a generates metadata that describes the use of the software applications installed on IHS 205a. The metadata resulting from the monitoring operations of the local monitor 210a may be transmitted to a remote analytics engine 230.

The analytics engine 230 processes the received metadata in order to determine relative valuations for the software applications installed on the IHS. These valuations generated by the analytics engine 230 are based on metadata describing the use of the software on an IHS. Generated in this manner, the metadata for a particular software application reflects the relative importance of the application to a user of the IHS. For instance, metadata describing the use of a photo editing software program may be generated by local monitor 210a. Metadata describing the use of the photo editing software may be used to describe various aspects of the files that are created and modified based on the operation of the software. This metadata describing the usage of the application may then be compared to metadata provided for other software applications in order to assess the relative values of the two software applications to the user. In certain embodiments, the metadata transmitted to the analytics engine 230 may be processed to determine the relative value of individual files associated with the photo editing software.

The relative value information generated by the analytics engine 230 may be used in backup procedures that are implemented by an IHS 205a-n. In certain embodiments, an IHS may utilize the valuation information provided for individual files in order to identify the files to be backed up by the IHS. In determining valuations for individual files, the analytics engine 230 may identify files that have been modified or created based on user input. Such user-modified files may be the product of significant effort by a user and may be necessary to restore a software application to a prior operating state, or to an approximated prior operating state. In certain embodiments, the relative value information generated by the analytics engine 230 may be used to determine the software applications that should be re-installed upon restoration of an IHS. The use of the valuation information generated by the analytics engine 230 in this manner allows for an IHS 205a-n to be rebuilt while refraining from re-installing software applications on the IHS that are infrequently or never used. Such use of relative value information generated by the analytics engine 230 allows for backup procedures and restoration procedures to be configured with minimal or no input from a user of the IHS.

Local monitors 210a-n may be configured according to various embodiments for tracking various aspects of the software operations of an IHS. In certain embodiments, local monitors 210a-n utilize one or more application monitors to generate metadata that may then be used to determine the relative value of the software applications, and the files associated with each software application, that are installed on an IHS. An application monitor may be configured according to various embodiments for monitoring the operation of a specific software application. For instance, in one potential embodiment an application monitor may be configured to track the use of a particular CAD (Computer-Aided Design) software application. In such an embodiment, the application monitor may be further configured to track individual files that are associated with the CAD application. For instance, the application monitor may track the generation of files that are created through the operation of the monitored CAD software. In the application monitor that is specific to a particular CAD application, the application monitor may track the generation of CAD drawings that have been created by a user of the CAD application. In addition to end-product files such as a CAD drawing, the application monitor may also track various other types of files that are generated due to the operation of the user, such as files used to store settings and customizations. As described in detail further below, the analytics engine 230 utilizes the metadata generated by an application monitor to determine a relative value for these files associated with the CAD software application.

In certain embodiments, an application monitor may be configured to track the use of a specific software application by monitoring changes to files associated with the monitored software application. For instance, an application monitor may track the frequency with which a particular file is accessed. A file containing information regarding settings and/or customizations may be accessed frequently with respect the use of the monitored application, thus indicating a significant value of these files to the users of the monitored application. In certain embodiments, an application monitor by be configured to track the length of time spent editing and/or accessing a particular file associated with the monitored application. The relative value of a file to a user of an IHS may be indicated by the length of time spent accessing and/or editing the file. In the illustrated embodiment, data describing aspects of the use of a software application may be provided to the analytics engine 230 via the metadata that is generated by the local monitors 210a-n.

In certain embodiments, an application monitor may be configured to monitor certain operations of the user interface of a monitored software application in order to identify files that reflect user input to the software application. For instance, an application monitor may track the length of time an application has the focus of the operating system user interface. In certain embodiments, an application monitor may track indications of user inputs, such as mouse clicks or other mouse operations, that indicate user input to the monitored software application. In certain embodiments, an application monitor may be configured to track the selection of menu options provided by the monitored software application, thus providing an indication both of the value of the application itself and the value of files that are generated and/or modified in response to the menu operations. An application monitor may also be configured to detect the individual files that are opened by the user via the user interface of the monitored software application.

In certain embodiments, an application monitor may be configured to generate metadata describing the files and directories associated with a monitored application. For instance, an application monitor may summarize the files present in each operating system directory associated with a monitored software application. In certain embodiments, the application monitor may summarize information such as the types of files (e.g., based on file extensions) and sizes of files in each directory associated with a monitored software application. As described below, the analytics engine 230 may be configured to utilize such directory and file metadata to determine whether an entire directory should be designated for back up.

As illustrated in FIG. 2, the local monitors 210a-n present on each of the IHSs 205a-n may be comprised of various combinations of application monitors. For instance, local monitor 210a includes three application monitors 215a-c. Each of the three application monitors 215a-c may be configured to track the operation and use of specific software applications, such as the CAD program described above. For instance, in the illustrated configuration, application monitor 215a may be used to track the CAD program, while application monitor 215b may be used to track the operation and use of a word processing program, and application monitor 215c may be used to track the operation and use of a video game. Each of the illustrated application monitors 215a-c may be configured to generate metadata that describes a respective software application.

In certain embodiments, each of the IHSs 205a-n may also utilize a backup component 225a-n. Backup components 255a-n may be utilized by an IHS 205a-n to implement procedures for backing up files to a backup repository. In certain embodiments, backup component 255a-n may implement procedures used to backup IHS 205a-n files to a remote storage location. In certain embodiments, backup components 255a-n may interoperate with other backup applications to implement the backup procedures utilized by an IHS 205a-n. In the illustrated embodiment, backup components 255a-n may be configured to create backup copies of IHS 205a-n files on a remote backup repository 220 and/or a cloud backup service 215. As described below, each backup component 255a-n may be configured to receive backup procedure inputs from the analytics engine 230, where the inputs specify relative values of the applications and/or files for which metadata has been reported by an IHS 205a-n. This valuation-based input from the analytics engine 230 may then be utilized by the backup component 255a-n to determine the files of an IHS 205a-n that should be prioritized for backup.

In certain embodiments, each of the IHSs 205a-n may also utilize a restoration component 260a-n. The restoration components 260a-n may be utilized in the restoration of the IHSs 205a-n to an approximated prior operating state. In particular, the restoration components 260a-n may keep track of the software applications loaded on a corresponding IHS 205a-n. In certain embodiments, the information maintained by the restoration component 260a-n may be utilized to select certain software applications to be re-installed on the corresponding IHS 205a-n as part of an approximated restoration of the IHS. By selectively re-installing software applications on an IHS, an approximation of a prior state is restored by the IHS, rather than an exact restoration of a prior state. In certain embodiments, the restoration component 260a-n may be configured to interface with one or more other components of an IHS 205a-n in order to implement a restoration procedures on behalf of an IHS.

As illustrated in the embodiment of FIG. 2, a restoration component 260a-n may include a manifest 265a-n that is used to track the software applications installed on an IHS 205a-n. In certain embodiments, the manifest 265a-n may include metadata that describes aspects of the use of the software applications that are listed in the manifest. For instance, the manifest maintained by the restoration components 260a-n may be used to track usage frequency information for each listed software application. The metadata that is used to generate and update the manifest may be provided, according to various embodiments, by the local monitors 210a-n. In the illustrated embodiment, metadata is generated by the local monitors 210a-n and provided to the telemetry component 225a-n and at least some of this metadata is provided to the restoration component 260a-n. Using the metadata, the restoration component 260a-n may be configured to update the manifest 265a-n to reflect any changes in the software applications installed on the IHS and to update the usage metadata that is associated with each software application. The manifest 265a-n may then be utilized by the restoration component 260a-n in the selection of software applications to be re-installed on the IHS 205a-n in order to restore the IHS to an approximation of a prior operating state.

As described below, a restoration component 260a-n may be configured to utilize valuation inputs provided by the analytics engine 230. As described, the analytics engine 230 may process metadata provided from each of the participating IHS 205a-n in order to determine relative valuations for the software applications installed on each of the IHSs. In certain embodiments, the analytics engine 230 may be configured to utilize the received metadata to maintain a manifest of the software applications installed on each of the IHS 205*a-n*. In certain embodiments, a manifest may be provided to the analytics engine 230 by the restoration components 260*a-n* of the participating IHSs 205*a-n*. The analytics engine 230 may utilize metadata received from a particular IHS (e.g., 205*a*) to generate relative value information for each of the software applications listed in the manifest for that IHS 205*a*. The analytics engine 230 may then provide the valuation information to the IHS 205*a*. In such embodiments, the restoration component 260*a* of the IHS 205*a* may incorporate the received valuations into the local manifest 265*a*. In certain embodiments, the metadata may be further utilized by the analytics engine 230 to generate restoration inputs that are provided to the restoration component 260*a* of the IHS 205*a*. In certain embodiments, these restoration inputs may be recommendations for re-installing each of the software applications listed in the manifest of the IHS 205*a*.

Each of the local monitors 210*a-n* may utilize a telemetry component 225*a-n* in the transmission of metadata to the analytics engine 230. For instance, local monitor 210*a* generates metadata using application monitors 215*a-c*. This metadata may be collected as it is generated by a telemetry component 225*a*. In certain embodiments, the telemetry component may be configured to periodically transmit metadata to the analytics engine 230. In certain embodiments, the telemetry component 225*a* may be configured to transmit metadata to the analytics engine 230 once a certain amount of metadata has been generated by one of the local monitors 210*a-n*. In other embodiments, the telemetry component 225*a* may transmit metadata to the analytics engine 230 as the metadata is received from the application monitors 215*a-c*.

Analytics engine 230 receives metadata provided by the telemetry components 225*a-n* associated with each of the IHSs 205*a-n*. In certain embodiments, the analytics engine 230 utilizes a telemetry component 250 that is configured to receive metadata from each of the IHSs 205*a-n*. In certain embodiments, the analytics engine 230 is configured to utilize a metadata repository 245 to store the metadata that is received via the telemetry component 250. According to various embodiments, the metadata repository 245 may be one or more repositories that are accessible by the analytics engine 235 and may be located locally or remotely from the analytics engine 230. Using the metadata stored in the metadata repository 245, the analytics engine 230 may utilize a value estimation component 235 to determine relative valuations for the software applications and files present on each of the IHSs 205*a-n*. In certain embodiments, the analytics engine 230 may be further configured to utilize a restoration analysis component 240 to process the metadata in order to determine restoration inputs specifying the relative value of the software applications installed on each of the IHS 205*a-n*. In certain embodiments, the analytics engine 230 may process the received metadata to build profiles that may be used to describe the typical use of software applications present on multiple of the participating IHSs 205*a-n*. These software applications profiles may be stored by the analytics engine 230 in an application knowledge base 270. Further detail describing the operation of the analytics engine 230 is provided with respect to FIG. 5.

Figure 3:
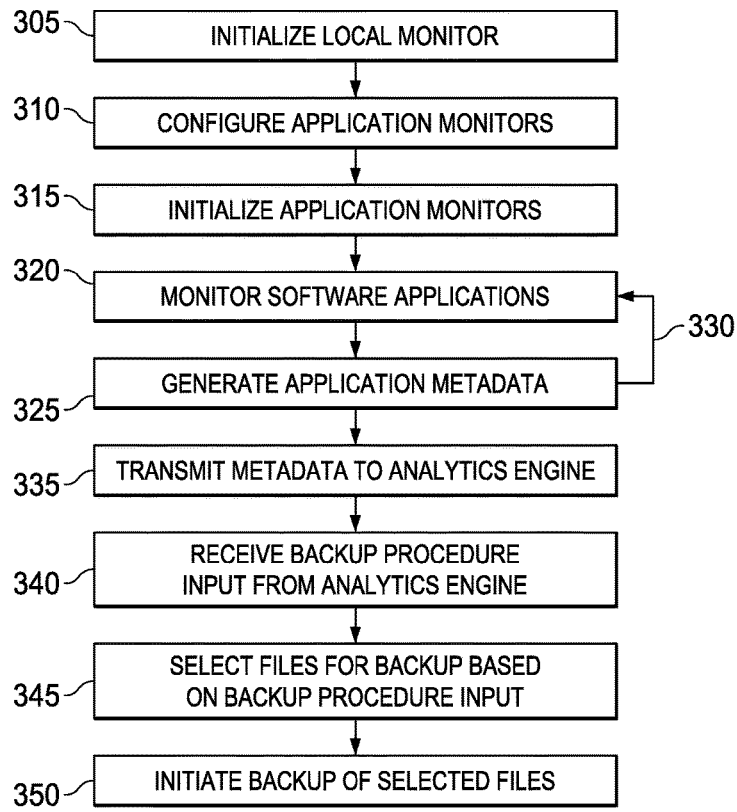
FIG. 3 is a flowchart illustrating certain steps of a process according to various embodiments by which an IHS monitors software applications for use in software backup procedures.

As described, an IHS may be configured according to various embodiments to generate metadata that may be processed by an analytics engine in order to determine relative valuations for the software applications and files that are utilized by the IHS. FIG. 3 illustrates certain steps of a process according to various embodiments by which an IHS monitors software applications and files for use in generating metadata and certain steps for utilizing value information provided by the analytics engine in the IHS's software backup procedures. The process of the illustrated embodiment begins at step 305 with the initialization of a local monitor. In certain embodiments, the local monitor may be a background process that is configured to start each time the operating system of the IHS is booted.

The local monitor may utilize components such as application monitors to capture data that can be used to determine relative valuations for the software application and files installed on an IHS. At step 310, these application monitors are configured for collecting the information that will be incorporated into metadata. In order to provide data collection, application monitors may be configured based on the specific software application being monitored. The application monitors may be configured according to various embodiments based on input provided by a user of an IHS, based on input provided by a configuration component located locally on the IHS and/or based on input provided by a remote analytics engine.

In certain embodiments, individual application monitors utilized by a local monitor may be configured in part based on input provided by a user or administrator of the IHS. For instance, upon installation or upgrading of a software program on an IHS, a user of the IHS may be provided with the option of authorizing a local monitor installed on the IHS to collect metadata pertaining to the use of the new or upgraded software program. The user may be asked to further authorize the use of the collected metadata by a remote analytics engine for use in providing valuation inputs for use by the backup procedures and restoration procedures implemented by the IHS. In certain embodiments, a user of the IHS may be prompted to provide or confirm the operating system directory where the new/upgraded software program is installed on the IHS. Based on such user-provided information, one or more application monitors may be configured as components of the local monitor operating on the IHS. For instance, user-input specifying the installation directory may be utilized by an application monitor in order to track file operations within the specified directory. In certain embodiments, a user may be provided with the ability to notify the local monitor of the installation of new software on the IHS. For instance, a user may be provided with a "Scan Now" feature that may be used to trigger the local monitor to scan for changes to the hardware and software installed on the IHS and to identity software associated with the new hardware and/or software. In certain embodiments, version information for a new or upgraded application may be included in the manifest and any existing application monitor may be reconfigured to track the new version of the application.

In certain embodiments, user-specified priority information may be utilized to configure certain aspects of an application monitor. For instance, a user may specify priorities for certain software applications installed on an IHS. Based on these priorities, application monitors may or may not be configured for certain applications. Also based on these priorities, application monitors may be configured in a manner that affects the amount of metadata generated. For instance, application monitors associated with applications designated as high priority may be configured to generate more metadata, while application monitors associated with low priority applications may be configured to generate minimal metadata. In certain embodiments, the amount of metadata collected by the local monitor, and any application monitors, may be configured based on the amount of local storage space that has been designated for use by the local monitor, or based on the amount of storage space designated for use by the analytics engine. In certain embodiments, application monitors may be configured based on the type of application to be monitored. For instance, user-level applications that generate output files, such as a word processing program, may generate more metadata than applications that do not typically generate output files, such as a PDF viewer.

The application monitors utilized by a local monitor may be configured in certain embodiments based in part on input provided by a configuration component that operates on the local IHS. In certain embodiments, a configuration component may automatically detect the installation of new software applications or the installation of new hardware, which may include associated software applications such as a hardware driver. Likewise, the configuration component may detect software applications being uninstalled form the IHS. For instance, the configuration component may periodically scan the registry or a device listing provided by the IHS for an indication of the installation of new software applications. Such a configuration component may then configure an application monitor to collect data pertaining to the use of the new software application.

In scenarios where a configuration component does not detect the installation of new software application or is not otherwise provided with information regarding a new software application, the configuration component may nonetheless be configured to detect the use of files not presently associated with any known software application. In such scenarios, the configuration component may utilize a generic application monitor that collects metadata for file operations regarding such unaffiliated files. In certain embodiments, the metadata collected by a generic application monitor may be reported to the analytics engine. In such embodiments, the analytics engine many be configured to learn certain aspect of unknown applications and/or unknown file types based on the metadata provided by the generic application monitor. For instance, based on the metadata provided by a generic application monitor, an analytics engine may ascertain directories, files and/or file types associated with an unidentified application. As with application monitors associated with known applications, the metadata provided by the generic application monitor may include file usage data that can be used to provide valuation information for files not presently associated with a software application. In certain embodiments, a generic application monitor may identify the utilization of new files and/or file extensions not associated with any software application installed on the IHS. In such scenarios, the analytics engine may be configured to learn whether new file extensions or new files are associated with a known software application. As described below, in certain embodiments, the analytics engine may be configured to compare the metadata received from the generic application monitor to metadata received from other IHSs in order to identify the software application that is associated with the files and/or file types included in the metadata that is being reported by the generic application monitor. Any such identification of a software application may then be used by the analytics engine to provide updated manifest information to the IHS. In this manner, the applications installed on an IHS may be learned by the analytics engine without reliance on user configuration of the monitoring capabilities.

In certain embodiments, input provided by a remote analytics engine may be utilized in configuring the application monitors. For instance, a configuration component on the local IHS may utilize valuation input from a remote analytics engine in configuring application monitors. As described above, an analytics engine may be configured to process metadata provided by local monitors located on multiple different IHSs. An analytics engine may be further configured to process the metadata from the multiple IHSs in order to determine typical values for applications and files. Based on these determined typical values, the analytics engine may be configured to provide input to an IHS that can be used as default configurations for newly initialized application monitors. For instance, upon installation of a new CAD software program on an IHS, input provided by the analytics engine may specify directories and/or files that should be tracked by a local monitor of the IHS. Such input may be generated by the analytics engine based on valuation determinations that have been previously made by the analytics engine based on metadata reported by other users of this same CAD program.

Referring back to FIG. 3, once the application monitors have been configured, at step 320 the application monitors begin monitoring information of interest based on the configuration of these monitoring components. Certain embodiments may utilize a local monitor component that monitors file operations without the use of application monitor components. Application monitors may be configured to monitor information of interest describing various aspects of the operation and use of a software application. Once configured, an application monitor may track the files that are generated and modified by the user. In addition, an application may monitor the time spent by the user in generating or modifying a file. Application monitors may be configured to track the time a user has spent viewing a software application based on the time the application has the focus of the operating system user interface. As described above, application monitors may be configured to generate metadata describing user input, such as keyboard and mouse input, to a software application. Various additional types of application monitors may be utilized that provide indications of the frequency and/or duration that different files associated with an application are utilized.

In certain embodiments, an application monitor may be configured to determine whether files relied upon by a monitored software application are remote files. For instance, an accounting application may be configured to interface with a remote financial data repository. An application monitor configured to track the file operations of the accounting application may be configured to detect interactions between the accounting application and the remote data repository. In certain embodiments, the application monitor may be configured to detect any credentials that are utilized by the software application to access the remote files. In addition to generating metadata that reports details describing an application's interaction with the remote files, the application monitor may also track the credentials used to access the remote files and include this credential information in the generated metadata. In certain embodiments, such metadata providing the credentials used to access remote file locations may be reported to the local restoration component and/or the analytics engine. Such credential information may be stored by the restoration component as an entry in the manifest used to track the software applications installed on the IHS. Upon restoration of an IHS, the restoration component may utilize this metadata to restore both the software application and the credentials needed to access the remote files.

At step 325, the information collected by the local monitor, including information collected by any application monitors that are employed, is used to generate metadata that may be transmitted to a remote analytics engine and, in some embodiments, to a restoration component of an IHS.

Certain embodiments may be configured to generate metadata as information is collected by the monitor components. Other embodiments may generate metadata periodically or based on a command signaling the transmission of metadata to the remote analytics engine. At step 330, upon the generation of metadata, the tracking of file operations by the monitoring components continues.

An example of a manifest including metadata generated by local monitoring by an IHS according to certain embodiments is provide in TABLE 1. As illustrated, the manifest may include information identifying the IHS. In the illustrated embodiments, that table specifies the operating system, including version information, that is installed on the IHS. Certain embodiments may also utilize a unique identifier associated with the IHS. For instance, the IHS may be uniquely identified using a Dell service tag identifier. Using the unique identifier, the manifest maintained locally by an IHS may be synchronized with a version of the manifest that is maintained and updated based on the processing of received metadata by the analytics engine.

TABLE 1

```
<manifest>
    <systeminfo>
        <service_tag>XKT9134</service_tag>
        <os>
            <name>Windows 7</name>
            <version major="6" minor="1"/>
            ...
        </os>
    </systeminfo>
    <applications>
        <application>
            <name>Chrome Broswer</name>
            <vendor>Google Inc.</vendor>
            <GUID>1e6ed082-e32d-4b2b-8b6a-70b094815135</GUID>
            <installdate>20150710</installdate>
            <version>49.0.2623.110</version>
            <state>installed</state>
            <usage last_usage="20150708" monthly_avg="21.94" use_count="134"/>
            <settings>18JF838JL</settings>
            ...
        </application>
        <application>
            <name>DropBox</name>
            <vendor>DropBox Inc.</vendor>
            <GUID>e62e393a-acc9-40d9-a34a-13a41f2eeef0</GUID>
            <installdate>20160109</installdate>
            <version>2.1.0.0</version>
            <state>installed</state>
            <usage last_usage="20160406" monthly_avg="36.84" use_count="12"/>
            <settings>XJK2I3JFS</settings>
            ...
        </application>
        <application>
            <name>Adobe Reader 13.0</name>
            <vendor>Adobe Inc.</vendor>
            <GUID>22b36743473e-4cff-9029-c8e8aabb881f</GUID>
            <installdate>20100913</installdate>
            <version>13.0.1.19332</version>
            <state>installed</state>
            <usage last_usage="20121128" monthly_avg="0.01" use_count="0"/>
            <settings>3884EJF83</settings>
            ...
        </application>
        <application>
            <name>Spotify</name>
            <GUID>22b36743473e-4cff-9029-c8e8aabb881f</GUID>
            <installdate>20100913</installdate>
            <version>9.43.2211</version>
            <vendor>Spotify<vendor>
            <state>installed</state>
            <usage last_usage="20160401" monthly_avg="42.33" use_count="3283"/>
            <settings>8E2QI875D</settings>
        </application>
        <application>
            <name>Turbo Tax</name>
            <GUID>22b36743473e-4cff-9029-c8e8aabb881f</GUID>
            <installdate>20150331</installdate>
            <version>15.4.3341</version>
            <vendor>intuit<vendor>
            <state>uninstalled</state>
            <usage last_usage="20150415" monthly_avg="0.04" use_count="4"/>
            <settings>93INZ83FJ</settings>
            ...
        </application>
        ...
    </apps>
    <drivers>
```

TABLE 1-continued

```
<driver>
    <provider>Dell</provider>
    <description>Dell ControlValue w/o Fingerprint Sensor</description>
    <version>9.18.13.2018</version>
    <state>installed</state>
    <usage last_usage="20150415" monthly_avg="0.04" use_count="4"/>
    <device_name>Dell ControlVault w/o Fingerprint Sensor</device_name>
    ...
</driver>
<driver>
    <provider>Intel</provider>
    <description>Intel(R) Ethernet Connection I218-LM</description>
    <version>1.0.4.2913</version>
    <state>installed</state>
    <usage last_usage="20160406" monthly_avg="100.00" use_count="130449"/>
    ...
</driver>
<driver>
    <provider>Dell</provider>
    <description>Dell Axim PDA</description>
    <version>1.32.1039</version>
    <state>Uninstalled</state>
    <usage last_usage="20040312" monthly_avg="0.00" use_count="204"/>
    ...
</driver>
...
</drivers>
<datastores>
    <store name="OneDrive" type="sync"/>
    <store name="DropBox" type="sync"/>
    <store name="Box" type="sync"/>
    <store name="Carbonite" type="backup"/>
    <store name="Mozy" type="backup"/>
</datastores>
</manifest>
```

Also included in the manifest of TABLE 1 is a listing of software applications installed on the IHS. In the illustrated embodiment, each software application is identified by name, vendor and global unique identifier. Such identifying information may be determined during the configuration of an application monitor associated with a particular application. Also included in the manifest entry are version and installation dates for each application. The illustrated manifest also includes an identifier for a settings file associated with the application. As described, a local monitor may be configured to detect the installation of new software on an IHS, thus providing such version and installation information describing the application. Each application entry in the manifest may also include utilization information generated by the associated application monitor. In the illustrated embodiment, the utilization metadata includes the date and time corresponding to the last time the application was used, the average number of times the application is used each month and the total number of times the application has been used.

The manifest provided in TABLE 1 also includes a listing of certain files determined to be of value to the user based on utilization of these files. In the illustrated example, the listed files include drivers associated with hardware installed on the IHS. Other embodiments may include other types of files associated with installed hardware. For each driver file listed in TABLE 1, the manifest includes information describing the driver, the version and installation status of the driver and utilization information for the driver. The manifest of TABLE 1 also includes a listing of the connections to remote data sources that have been identified by the local monitor associated with the IHS.

At step 335, metadata is transmitted by an IHS to a remote analytics engine. In certain embodiments, the transmission of metadata to the remote analytics engine may be done periodically by the IHS. In certain embodiments, commands may be utilized to trigger the transmission of metadata to the remote diagnostic service. For instance, commands issued by a backup procedure module on the IHS may be used to signal the transmission of all available metadata to the remote diagnostic service. Such a command may be issued by the backup procedure module as an aspect of regular backup procedures performed by the IHS. Similarly, a command to signal transmission of metadata to a remote analytics engine may be issued by a remediation module of the IHS. In certain embodiments, metadata may be transmitted to a remote analytics engine based on the detection of certain conditions in the IHS, such as the installation of a new software application or based on the detection of certain error conditions.

As described, the analytics engine may be configured to process the received metadata in order to determine relative valuations for software applications and files installed on the IHS. The metadata describes the operation and use of software applications and files by the user. Accordingly, the processing of this metadata by the analytics engine may be used to generate valuation information that reflects the use of individual software files associated with software application. The valuation determinations made by the analytics engine may then be utilized to generate inputs that are provided back the IHSs. The inputs provided by the analytics engine may specify valuations that may be used by an IHS to determine the files that should be backed up by the IHS and the applications that should be reinstalled in order to restore the IHS to an approximated prior operating state.

At step 340, the IHS receives backup procedure input from the analytics engine. As described below with respect to FIG. 5, based on metadata provided by the IHS, the analytics engine determines valuations for the software applications and files for which metadata has been provided by the IHS. In certain embodiments, the valuation determinations made by the analytics engine are then used to provide backup procedure inputs to the IHS. At step 345, the backup procedure inputs are utilized by the IHS to select files to be backed up. Once a file has been selected for backup, at step 350, these files may be copied to a remote backup location. In certain embodiments, the files are backed up as part of a set of regular backup procedures implemented by the IHS.

Figure 4:
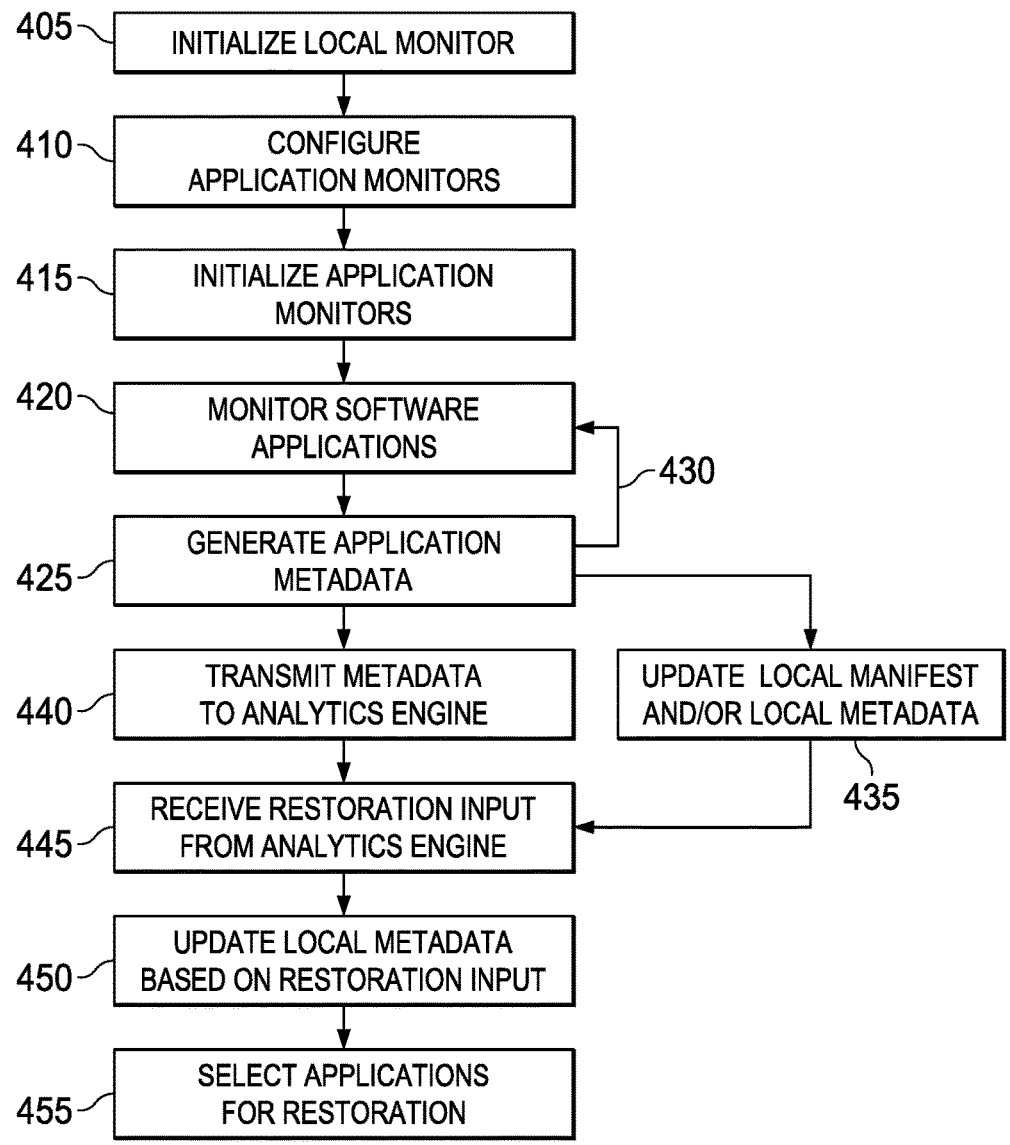
FIG. 4 is a flowchart illustrating certain steps of a process according to various embodiments by which an IHS monitors software applications for use in software restoration procedures

FIG. 4 is a flowchart illustrating certain steps of another process according to various embodiments by which a software restoration procedure utilizes application monitoring and valuation input provided by a remote analytics engine. Like the backup procedure embodiment of FIG. 3, the software application restoration process implemented by an IHS begins at step 405 with the initialization of a local monitor and continues at steps 410 and 415 with the configuration and initialization of application monitors for collecting information that will be incorporated into metadata. As before, the application monitors may be configured according to various embodiments based on input provided by the user of an IHS, based on input provided by a local configuration component of the IHS and/or based on input provided by a remote analytics engine.

The software application restoration continues at step 420 with the monitoring of file operations by the application monitors based on the configuration of these monitoring components. At step 425, metadata is generated by the application monitors and step 430, the IHS continues monitoring information of interest. As with the embodiment of FIG. 3, metadata is transmitted from the IHS to a remote analytics engine at step 440. In the embodiment of FIG. 4, the metadata may be used, at step 435, to update a local software application manifest. As described, a manifest may be utilized to provide a listing of software applications currently installed on IHS. Also as described above, the manifest may provide various additional information regarding each software application, such as utilization and version information. In scenarios where the reported metadata includes information that specifies the installation or removal of a software application, such metadata may be used to update the local version of the manifest to reflect these changes to the installed software.

In certain embodiments, at step 435, the metadata generated by the local monitor may also be used to update various aspects of the metadata that are maintained locally on the IHS. In certain embodiments, the local metadata maintained by an IHS is a subset of the metadata that is generated by the local monitors and transmitted to a remote analytics engine at step 440. For instance, the IHS may maintain a local copy of certain metadata that can be used to provide an approximated indication of the relative value of each software application listed in the manifest. For instance, the local metadata may track the usage frequency for each application listed in the metadata. Another example of relative valuation metadata that may be maintained locally is the last time a software application was initialized by the user. Another example of locally maintained metadata may be the total time a user has spent operating a software application over a certain time interval. Using the metadata provided by the local monitors of the IHS, such locally-maintained metadata may be updated in order to maintain an approximate indication of the value of each software application to the user.

As described, in addition to being used to maintain a local version of the metadata for an IHS, the generated metadata may also be reported to an analytics engine. In certain embodiments, all metadata generated by local monitors is transmitted for processing by an analytics engine. As described below, the analytics engine may utilize the provided metadata to determine the relative valuation for the software applications installed on an IHS. These value determinations made by the analytics engine may be provided to the IHS, at step 445, as restoration inputs. At step 450, the restoration inputs provided by the analytics engine are received by the IHS and are used to update the local version of the manifest and any locally maintained metadata. In certain embodiments, the restoration inputs may include a relative value rating for each of the installed software applications. Once received by the IHS, such relative valuation ratings may be used to make any necessary updates to the local metadata maintained by the IHS. For instance, the valuation ratings provided by the analytics engine may be stored locally as a component of the manifest entry for each installed software application. The restoration component may rely on a local valuation approximation, such as usage frequency, that is derived by the restoration component until a valuation rating is provided by the analytics engine. In certain embodiments, once a valuation rating has been provided by the analytics engine, the restoration component may base restoration determinations on this provided valuation.

At step 455, the local metadata and manifest are used to determine the software applications to be re-installed by an IHS. A wide variety of scenarios may necessitate reverting an IHS to a prior operating state. In many scenarios, an approximation of a prior operating state may be sufficient. As such, an IHS may benefit from only re-installing high value software applications that are actually used. By selectively reinstalling only certain software applications, the re-installation process may be simplified significantly. An IHS may be configured to utilize the local manifest and metadata to generate a prioritized listing of the software applications installed on an IHS. Software applications listed in the manifest that do not satisfy a minimum threshold of use may be omitted from the software applications that are re-installed on an IHS.

Figure 5:
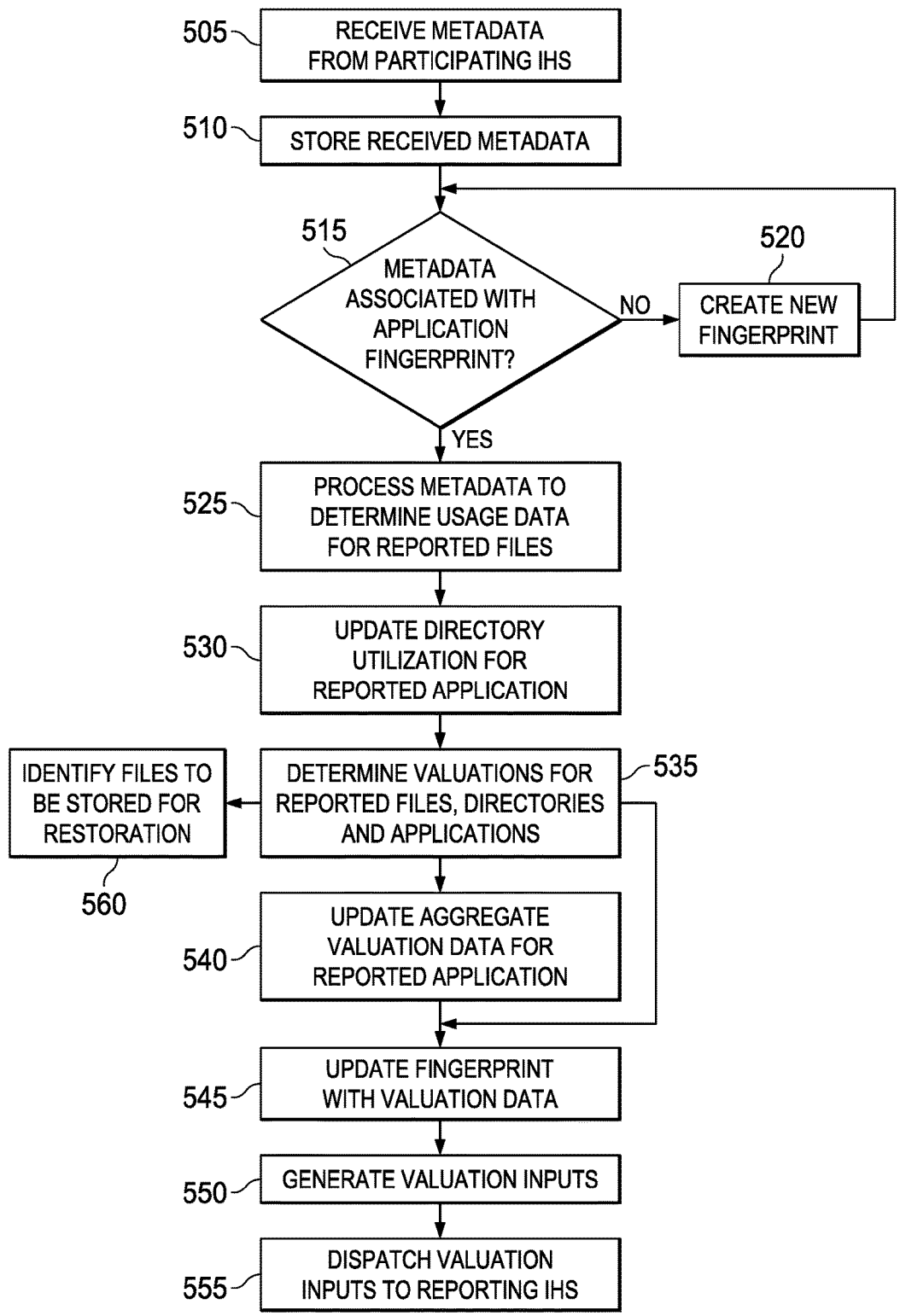
FIG. 5 is a flowchart illustrating certain steps of a process according to various embodiments by which an analytics service provides software backup procedure inputs and software restoration procedure inputs.

FIG. 5 is a flowchart illustrating certain steps of another process according to various embodiments by which an analytics engine processes metadata and generates backup procedure and restoration procedure inputs. At step 505, the analytics engine receives metadata from the participating IHS. As described, each participating IHS may be configured to monitor the use of installed software applications and to generate metadata describing certain of the monitored aspects. Each participating IHS transmits generated metadata to the analytics engine. At step 510, the analytics engine may store the received metadata in a repository from which the metadata can be accessed for valuation processing. The analytics engine may then process the stored data to determine valuation information for the reported files and applications. The analytics engine may utilize certain of the following steps described with respect to FIG. 5 in various combinations and sequences.

In certain embodiments, the analytics engine may utilize application fingerprints to associate metadata with one of the software applications installed on the IHS. An application fingerprint may be utilized to uniquely identify a software application installed on an IHS and to provide a mechanism for associating relevant metadata with the application. For instance, an application fingerprint may be used to specify information such as files, file types, directories, remote storage locations and/or geolocations associated with an application. FIG. 8 depicts an example of a table used by an analytics engine to maintain application fingerprints. As illustrated, the fingerprint table of FIG. 8 includes application fingerprints associated with two IHSs, M1 and M2. For each of these IHSs, the fingerprint table includes an entry for each file associated with an application for which metadata has been reported. For instance, on M1, metadata has been reported for applications A1, A2 and A3. The directories associated with each of these applications is also included in the table. For instance, directories D1 and D2 are associated with application A1. For each directory, the map also includes the file types of the files in each directory for which metadata has been reported. In the illustrated example, based on the reported metadata for application A1 installed on IHS M1, file type FT1 has been associated with directory D1 and file type FT2 has been associated with directory D2. For each of these file types included in an application fingerprint, the table may further include specific files for which metadata has been reported. For instance, metadata has been reported for file F1 of file type FT1 where this file is present in directory D1 of application A1 installed on IHS M1. In certain embodiments, the application fingerprint may also indicate the storage location of a file. In the illustrated application fingerprint, storage locations SL1 and SL2 are indicated for files that are stored respectively at these two locations. All other files are stored locally on the IHS.

In certain embodiments, the fingerprint table may also be utilized to track geolocations associated with the applications installed on an IHS. In such embodiments, the local monitor of an IHS may be configured to include geolocation information in the metadata reported to the analytics engine. The geolocation information may be used to indicate a location of the IHS when a file has been modified. For instance, in the illustrated fingerprint, file F1 associated with application A1 installed on IHS M1 has been modified at geolocation GL1 and file F4 associated with application A2 has been modified at location GL2. In embodiments that utilize geolocation information, a local monitor may be configured to generate metadata that includes the geolocation of an IHS during the reported file operations. The geolocation information may be incorporated into the application fingerprint as illustrated in FIG. 8 and the analytics engine may utilize this geolocation information in determining valuations. For instance, the analytics engine may assign a higher valuation to all files generated or modified while the IHS is located at a work location, while a lower valuation may be associated with files modified at a more leisurely location, such as a coffee shop.

At step 515, the analytics engine determines whether newly received metadata is associated with an existing application fingerprint and thus associated with a software application that is known to the analytics engine. If the received metadata is not associated with any existing application fingerprint, at step 520, a new fingerprint may be created for the new metadata. As described, in certain scenarios, a generic application monitor may be used to capture information describing unknown software applications (i.e., applications that are not listed in the manifest of an IHS) and files and file types not presently affiliated with any software applications installed on an IHS. In such scenarios, the analytics engine may utilize aggregated metadata to learn the identity of the software application that is associated with the unaffiliated files and file types. Upon receiving metadata from a generic application monitor, the analytics engine may compare this metadata to application profiles stored in an application knowledge base. These application profiles may be constructed based on metadata provided from multiple IHSs. The profiles represent typical valuation information for applications, files, file types and directories that are present in multiple IHSs. Using the application profiles stored by the application knowledge base, the analytics engine may learn the software application that is associated with the metadata provided by the generic application monitor. The learned information may then be used by the analytics engine to provide configuration information to the IHS for use in the configuration of application monitors directed at the specific application identified via the learning operations of the analytics engine. In this manner, the information learned by the analytics engine may be used to replace generic application monitors with more particularized application monitors that are configured based on metadata aggregated from multiple IHSs. This allows the configuration of local monitoring without requiring configuration of the monitoring by the user. In certain embodiments, the analytics engine may utilize the profile information to construct an application fingerprint for the learned software application.

At step 525, the analytics engine processes the received metadata in order to determine usage information for the files for which data has been reported. For instance, from the metadata, the analytics engine may determine the number of times a file has been accessed, the time spent accessing a file, whether edits were made to the file and other such metrics of user interaction with a particular file. In certain embodiments, metadata may be provided that describes user input to the monitored application in addition to providing metadata describing file operations. For instance, the user input metadata may provide information regarding mouse and/or keyboard inputs by the user, such as the selection of menu options, whether the application has the focus of the operating system user interface, typing while the application has the focus and/or mouse clicks within the application. The detection of user inputs may be utilized to ascertain whether files have been edited based on input by the user, thus indicating files of particular value to the user rather than program files that are components of the application, but do not directly reflect any user input. Both a program file and a user-edited file may be deemed to have elevated valuations based on the frequency and/or duration of access, but the analytics engine may assign a higher valuation to the user-edited file since such files may not be easily replaced.

In certain embodiments, the analytics engine may be configured to utilize application profiles in the determination of a valuation rating for a particular file. As described, an application fingerprint may include utilization information associated with an application for which metadata has been reported by an individual IHS. The analytics engine may utilize an application fingerprint to generate a valuation rating for files, directories and/or applications. In certain embodiments, the analytics engine may also consult the aggregated utilization information provided in application profiles that may be stored in an application knowledge base. For instance, the application profile may include aggregated valuation information for a file type for which multiple IHSs have reported metadata. In determining a valuation rating for a file on a particular IHS, the analytics engine many consult the application fingerprint associated with the particular IHS and also consult an application knowledge based for aggregated valuation information for this same file or file type. Based on the aggregated valuation information, the analytics engine may increase or decrease the valuation for a particular file.

At step 530, in certain embodiments, the analytics engine further processes the provided metadata in order to determine usage information for directories associated with the reported file information. Directory usage information may be provided as part of the metadata or may be determined by the analytics engine based on the file usage information provided in the metadata. The analytics engine may utilize directory usage information in order to identify directories of particular value to the user. In some scenarios, the analytics engine may recommend high value directories for wholesale backup. For instance, the analytics engine may track the percentage of files within each directory that have been modified in response to user input. Directories with a high percentage of such user-modified files may indicate the location of directories to which user-generated files are being saved. Various embodiments may employ other file operation metrics for evaluating the utilization of directories that are associated with a monitored application.

Directory usage information may be utilized by the analytics engine to generate backup procedure recommendations for an IHS. For example, a CAD software application may provide separate default directories for the storage of drawings, templates and customizations. An application monitor associated with the CAD may be configured to generate metadata that provides information describing the creation and modification of files in these directories, as well as information describing associated input to the user interface of the CAD program. Via processing of this metadata, the analytics engine may identify these directories as having a high percentage of potentially user-generated files. Such directories may be recommended by the analytics engine for wholesale backup by the IHS. The analytics engine may be configured to further process the metadata to determine that only specific file extensions within these directories are associated with user input. In such scenarios, the analytics engine may recommend wholesale backup of these directories by the IHS, but only for certain file types within each of the directories.

With the utilization of files and directories completed, at step 535, the analytics engine determines valuations for the files and directories for which data has been reported. The analytics engine, according to various embodiments, may calculate valuation ratings for each file for which metadata has been reported. For instance, in certain embodiments, the valuation rating for each file may be a score that is based on the amount of time and/or frequency that the file has been accessed. The analytics engine may assign higher scores for files that have been modified, with higher scores assigned to files modified based on user input to the monitored software application. In certain embodiments, the analytics engine may assign higher scores for user-modified files, where the score increases according to the amount of time the user spent accessing the file, thus indicating a file that includes significant user input. The analytics engine may assign higher scores for files in certain directories and/or files of certain file extensions. Embodiments may utilize various such metrics for determining the relative value of the files for which metadata has been reported.

In certain embodiments, the analytics engine may be configured to learn types of high valuation files based on the use of anomaly detection in the received metadata. For instance, by identifying files associated with certain deviations in the metadata, high value files may be identified. As described, the analytics engine receives metadata from multiple participating IHSs and utilizes the data to identify typical high valuation files, file types, applications and directories. As described above, writes to a file may indicate use input and thus indicate a high value file. However, the analytics engine may determine that files that are read but never written (such as a driver) also indicate a high valuation file. Based on this anomaly, files such as drivers may receive higher valuation scoring. In this manner, the analytics engine may be configured to identify anomalous usage patterns for files, directories and/or applications. In another scenario, the analytics engine may determine that a specific set of directories is usually associated with a specific software application, such as a CAD program. Certain of these standard directories of the CAD program may be known to store high-value user generated drawings and other standard directories may store low-value CAD program files. The analytics engine may determine that anomalous, non-standard directories may also include high-value files. Due to the anomalous nature of the directory that indicates files of importance to the user, a higher valuation score may be assigned to this particular directory. In this manner, the analytics engine may learn types of anomalous files, file types and directories that should be receive higher scoring in the calculation of valuation rating.

In certain embodiments, the analytics engine may be configured to determine the valuation rating for a file based in part upon a cost associated with replacing the file. In some scenarios, the provided metadata may include information that indicates that a financial cost may be associated with replacing a file. For instance, certain of the files being monitored on an IHS may be authored works, such as music files, that may have been purchased by the user. The analytics engine may infer whether such files are purchased files based on file extensions and the directory in which the files are located. In some scenarios, the provided metadata may include information that indicates a cost associated with reproducing a file. For instance, certain files may be ripped video or music files that can be regenerated by the user, but would require the user locating the original medium and ripping the audio or video file. In another example, certain files may contain significant state information, such as virtual machine snapshots, that would be difficult for a user to recreate. The analytics engine may be configured to identify such files based on file extensions and/or the directory in which the file is located.

Also at step 535, the analytics engine may also determine valuations for individual directories based on the utilization of files within each directory. Similar to the valuation ratings provided for files, the analytics engine may assign directories with higher scores based on the number or percentage of files in the directory that appear to include user input. The analytics engine may also base directory valuations on the cumulative time spent by the user in modifying or creating files in the directory. Embodiments may utilize various such metrics for determining the relative value of the directories for which metadata has been reported.

The analytics engine may determine additional valuations at step 535 for the software applications for which metadata has been reported. The analytics engine may assign valuation ratings to each application based on the cumulative valuation of the files and directories associated with the application. In certain embodiments, the analytics engine may also incorporate priority information into the valuation assigned to an application. The priority information may be provided by a user via configuration of the backup procedures and/or restoration procedures for the IHS on which the application is installed. The analytics engine may employ various additional methods for determining the relative value of the software applications for which metadata has been reported.

At step 545, the analytics engine updates the fingerprint associated with the application to reflect the updated valuation data. In this manner, the application fingerprint is used to maintain valuation data associated with the files and directories associated with an application. In addition, the application fingerprint may be used to maintain valuation information for the application itself. As described, in addition to valuation determinations, the application fingerprint may be used to store various additional determinations such as file types associated with the application that have been determined to reflect user input, determinations of remote storage locations and the credentials used to access these remote files and metrics of file, directory and application utilization that are relied upon by the analytics engine.

At step 550, the analytics engine may provide certain of this valuation information to a participating IHS. This valuation information may be provided as inputs to a participating IHS on a periodic basis, based on a command issued by an administrative application or based on a request from an IHS. The valuation inputs provided by the analytics engine may include valuation ratings for files for which metadata has been reported by the IHS. These file valuations may be provided for every file for which metadata has been reported by the IHS or may be provided only for certain files. For instance, the analytics engine may provide inputs only for files determined to have valuations that indicate the files should be designated for backing up by the IHS. Also at step 550, the valuation inputs provided by the analytics engine may provide valuations for directories associated with files for which metadata has been provided. In certain scenarios, the analytics engine may provide valuation inputs for directories only for directories that have been determined should be backed up wholesale by the IHS. Also at step 550, the analytics engine may provide valuation inputs that relay the relative valuation determinations for software application for which metadata has been provided. The analytics engine may be configured to provide valuation determinations for all software applications, or only those for which updated valuation determinations have been made.

At step 555, the valuation inputs are dispatched to the participating IHSs. As described above, the valuation inputs provided with respect to files and directories may be provided to an IHS, which may then utilize this valuation data to designate files and/or directories for backup by a backup component of the IHS. Also as describe above, the valuation inputs provided with respect to the applications installed on an IHS may be used by the IHS to designate software programs for re-installation upon restoration of the IHS to an approximated prior operating state.

At step 540, the analytics engine may be configured in certain embodiments to aggregate and process metadata received from multiple participating IHSs. In such embodiments, the analytics engine may use received metadata to build profiles for software applications that are installed on multiple IHSs. The analytics engine may utilize these application profiles in order to determine typical valuations for files, directories and applications. The typical valuations are based on the aggregated metadata provided from multiple participating IHS. In scenarios where file, directory and/or application valuations are consistent across the metadata provided from the participating IHSs, the analytics engine may determine that typical valuations may be utilized to configure the backup procedures and/or restoration procedures for an IHS that is installing an application for the first time.

For example, the analytics engine may receive metadata from multiple IHSs that have a specific CAD program installed. The analytics engine may aggregate the metadata associated with the CAD program that is received from each IHS. The aggregated metadata may be used to build a profile for the CAD program where the profile includes typical valuations for files and directories associated with the CAD program. Based on this profile for the CAD program, the analytics engine may identify specific files, file types and/or directories that are typically associated with high valuation ratings. The analytics engine may store the typical valuations in the profile associated with the CAD program. In response to a request for valuation determinations by an IHS that has recently installed the CAD program, the analytics engine may use the typical valuation information to provide the IHS with valuation inputs. In this manner, backup procedure and restoration procedures may be configured by an IHS based on typical valuations generated by the analytics engine such that a user of the IHS may rely on these typical valuation for the configuration of backup and/or restoration procedures.

Figure 6:
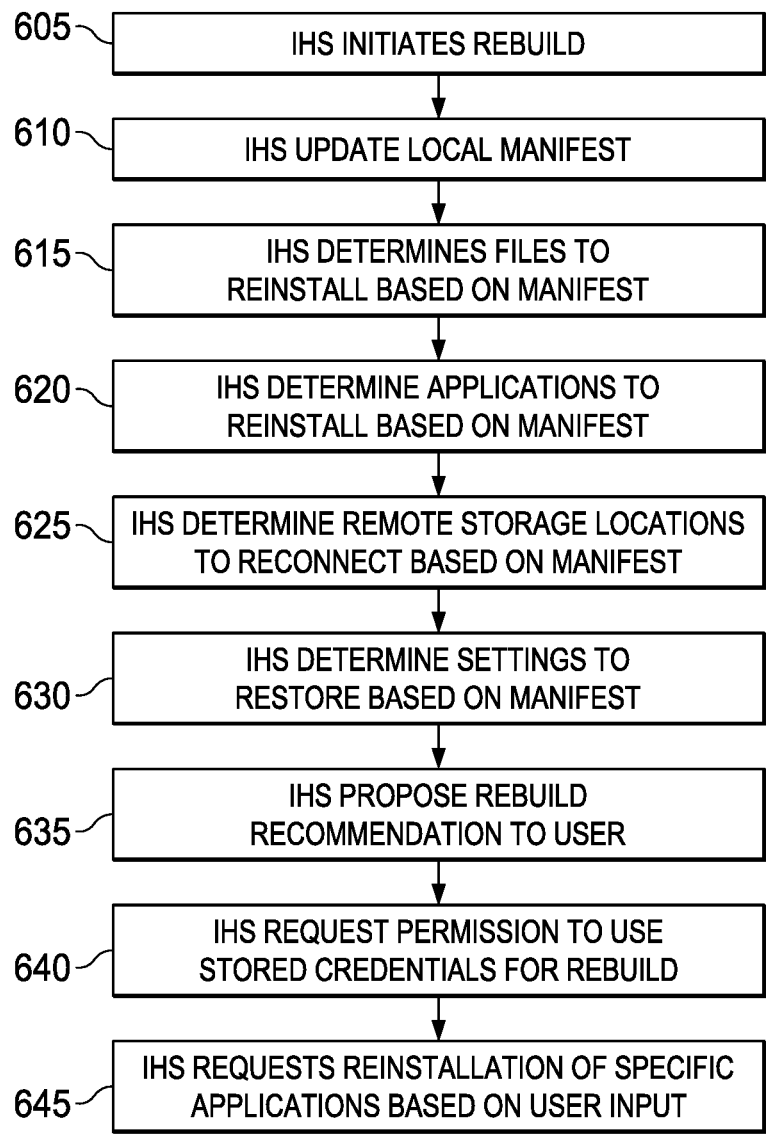
FIG. 6 is a flowchart illustrating certain steps of a process according to various embodiments by which an IHS implements a restoration procedure.

FIG. 6 is a flowchart illustrating certain steps of a process according to various embodiments by which an IHS implements a software restoration procedure using manifest information that includes valuations based on metadata generated using application monitoring. At step 605, the IHS detects a condition requiring a rebuild of the IHS system and initiates the rebuild. A rebuild may require reinstallation of the IHS operating system and thus may also require reinstallation of all software applications installed on the IHS. At step 610, the restoration procedure updates the manifest maintained by the IHS. As described above, an IHS may maintain a manifest listing each software application installed on the IHS and metadata providing utilization information for each of the software applications. In certain embodiments, the manifest maintained by the IHS may be populated in full or in part using inputs provided by a remote analytics engine. In such embodiments, the local manifest may be updated based on input provided by the analytics engine.

As described, a manifest may be stored locally by an IHS and a manifest may also be maintained by the remote analytics engine based on the metadata provided by the IHS. In certain embodiments, a manifest may be stored in additional locations. For instance, the manifest may be periodically stored to a non-volatile storage, a secondary local storage, a network storage location and/or a cloud storage location. By storing the manifest in additional locations, the manifest is further protected from loss due to failure conditions in the IHS and also allows the operating system and software applications of the IHS to be reinstalled based on the manifest.

At step 615, the IHS uses the manifest information to determine files to be reinstalled upon restoration of the IHS. As described above, the usage information generated using application monitors may be used to identify high valuation files, such as hardware drivers. The restoration procedure may utilize this manifest information to identify high valuation files for reinstallation upon restoration of an IHS. As described above, the manifest may include valuation information for each of the software applications installed on an IHS. At step 620, the IHS uses this manifest information to determine whether to reinstall an application upon restoration of the IHS. In certain embodiments, the IHS may determine may only reinstall an application if it has valuation rating above a certain threshold.

At step 625, the IHS uses the manifest information to determine whether connections should be re-established by the IHS to specific remote storage locations. As described, in instances where an application accesses remote files, an application monitor may collect information regarding the utilization of remote files and the credentials used to access the remote files. The credentials may then be maintained in the metadata associated with the application relying on the files. If the utilization of the remote files indicates a significant value for these remote files, a restoration component may determine that the associated credentials should be used by the IHS to re-establish the connection to these remote files during the restoration of an IHS. In certain embodiments, the IHS may be configured to utilize the credentials maintained in the metadata to automatically reestablish these connections to remote files regardless of valuations.

At step 630, the IHS may further utilize metadata information to determine whether application configuration settings should be reapplied upon reinstallation of the application. In an IHS configured with a local monitor, application monitors may generate metadata describing file operations for files that are used to store software application settings. In certain embodiments, an analytics engine may be configured to identify files as software application settings and may identify such files in the restoration and/or backup inputs provided to a participating IHS. An IHS may be configured to utilize this setting information in the configuration of reinstalled applications With the determinations for the inclusion of files, applications, settings and remote connections determined, at step 635, the IHS may provide these determinations for approval by a user. For instance, the IHS may provide a user interface by which a user can be asked to confirm or edit the recommendations provided by the IHS. An example of such a user interface is provided with respect to FIG. 7. In some configurations, the IHS does not provide a user interface for confirmation of the restoration determinations and, instead, the IHS automatically proceeds to step 640. At step 640, the IHS may prompt for confirmation of the use of credential information that has been captured by local monitors and stored in the manifest. At step 645, a the restoration module of an IHS initiates re-installation of the specified applications, files, remote connections and settings based on the inputs provided by the analytics engine. The restoration module of an IHS may be configured according to embodiments to interface with various local and remote resources to request the software to be re-installed.

FIG. 7 illustrates a user interface, configured according to certain embodiments, for providing restoration determinations to a user for confirmation or editing. In the illustrated embodiment, a user is provided with a listing of software applications 710 for which restoration determinations have been made, as provided above, by an IHS. Based on the metadata maintained for each of the listed applications, column 725 provides the length of time since each of the applications was last used. Other embodiments may provide the user with additional or different metadata. Column 730 provides a restoration recommendation provided based on the processing of metadata by the analytics engine as described above. In the illustrated embodiment, for each application, the IHS provides a recommendation to download and reinstall the application or a recommendation to refrain from reinstalling the application. Other embodiments may provide additional or different restoration recommendations.

The user interface may also include a listing of remote data connections 715 for which restoration recommendations have been provided by the analytics engine. Column 725 includes the length of time since each connection was last used and column 730 includes the recommendation to reconnect and perform synchronization or recovery operations with the remote data source. The user interface may also include a listing of software drivers for which determinations have been made. Column 725 includes the duration since each driver was last used and column 730 includes the recommendation to download and install the driver or refrain from installing the driver.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for determining procedures for backing up software files installed on an IHS (Information Handling System), the method comprising:

receiving first metadata describing file operations on a first IHS, wherein the first metadata includes information describing monitored file operations for a first software file on the first IHS;
determining, based on the first metadata, a valuation for the first software file, wherein the valuation is determined based on a level of monitored file operations for the first software file;
determining a decision to back up the first software file based on the determined valuation of the first software file;
transmitting the backup recommendation to the first IHS;
receiving second metadata describing input to a user interface of a software application installed on the first IHS; and
determining, based on the first metadata and the second metadata, whether the monitored file operations resulted from the input to the user interface reported in the second metadata.

2. The method of claim 1, wherein the monitored file operations indicate storage of user input to the first software file.

3. The method of claim 1 wherein the valuation of the first software file is increased if the monitored file operations are determined to result from the input to the user interface reported in the second metadata.

4. The method of claim 1, further comprising:
receiving third metadata describing file operations on a second IHS, wherein the third metadata includes information describing monitored file operations for a second software file on the second IHS;
determining, based on the received third metadata, a valuation for the second software file, wherein the valuation is determined based on a level of file operations for the second software file;
determining, based on the first metadata and the third metadata, whether the first software file and the second software file are of a same type and each have a valuation above specified threshold; and
increasing the valuation of the first software file and the second software file, if the first software file and the second software file are determined to be of the same type and determined to have a valuation above the specified threshold.

5. The method of claim 4, wherein the type of the files is determined based on the extensions of the files.

6. The method of claim 1, further comprising:
determining, based on the first metadata, a directory on the IHS in which the first software file is located;
adjusting a valuation for the directory based on the valuation of the first software file; and
determining a decision to back up the directory based on the determined valuation of the directory.

7. A method for determining software restoration procedures for use by an IHS (Information Handling System), the method comprising:
receiving first metadata describing file operations on a first IHS, wherein the first metadata includes information describing monitored file operations for a first software file on the first IHS, wherein the monitored file operations for the first software file indicate storage of user input to the first software file;
determining, based on the first metadata, a valuation for the first software file, wherein the valuation is determined based on a level of monitored file operations for the first software file;
identifying a first software application installed on the first IHS, wherein first software application is associated with the first software file;
updating a valuation for the first software application based on the valuation of the first software file;
determining a recommendation to reinstall the first software application on the first IHS based on the updated valuation of the first software application;
transmitting the reinstallation recommendation to the first IHS;
receiving second metadata describing input by a user to a user interface of the first software application; and
identifying, based on the first metadata and the second metadata, whether the file operations resulted from user input to the user interface reported in the second metadata.

8. The method of claim 7, wherein the first software application may be used to modify the first software file.

9. The method of claim 7, wherein the first software file is used to configure the first software application.

10. The method of claim 7, wherein the valuation of the first software file is increased if the file operations are identified as resulting from user input to the user interface reported in the second metadata.

11. The method of claim 7, further comprising:
receiving third metadata describing file operations on a second IHS, wherein the third metadata includes information describing monitored file operations for a second software file on the second IHS; and
determining, based on the first metadata and the third metadata, whether the first software application is installed on the second IHS.

12. The method of claim 7, wherein the software preservation procedure is a procedure for reinstalling the first software file on the IHS.

13. An IHS (Information Handling System), comprising:
a processor; and
a hardware memory coupled to the processor, wherein the hardware memory has program instructions stored thereon that, upon execution by the processor, cause the IHS to:
receive first metadata describing file operations on a first IHS, wherein the first metadata includes information describing monitored file operations for a first software file on the first IHS;
determine, based on the first metadata, a valuation for the first software file, wherein the valuation is determined based on a level of monitored file operations for the first software file;
determine a decision to back up the first software file based on the determined valuation of the first software file;
transmit the backup recommendation to the first IHS;
receive second metadata describing input to a user interface of a software application installed on the first IHS; and
determine, based on the first metadata and the second metadata, whether the monitored file operations resulted from the input to the user interface reported in the second metadata.

14. The IHS of claim 13, wherein the valuation of the first software file is increased in response to a determination that the monitored file operations result from the input to the user interface reported in the second metadata.

15. The IHS of claim 13, wherein the program instructions, upon execution, further cause the IHS to:

receive third metadata describing file operations on a second IHS, wherein the third metadata includes information describing monitored file operations for a second software file on the second IHS;

determine, based on the received third metadata, a valuation for the second software file, wherein the valuation is determined based on a level of file operations for the second software file;

determine, based on the first metadata and the third metadata, whether the first software file and the second software file are of a same type and each have a valuation above specified threshold; and increase the valuation of the first software file and the second software file, if the first software file and the second software file are determined to be of the same type and determined to have a valuation above the specified threshold.

16. The IHS of claim 15, wherein the type of the files is determined based on the extensions of the files.

17. The IHS of claim 13, wherein the program instructions, upon execution, further cause the IHS to:

determine, based on the first metadata, a directory on the IHS in which the first software file is located;

adjust a valuation for the directory based on the valuation of the first software file; and determine a decision to back up the directory based on the determined valuation of the directory.

* * * * *